United States Patent [19]

Sutton et al.

[11] 3,907,997

[45] Sept. 23, 1975

[54] ANTI-ARTHRITIC COMPOSITIONS COMPRISING AMIDE DERIVATIVES OF PULVINIC ACID AND METHODS OF PRODUCING ANTI-ARTHRITIC ACTIVITY

[75] Inventors: Blaine M. Sutton, Hatboro; Joseph Weinstock, Phoenixville, both of Pa.

[73] Assignee: SmithKline Corporation, Philadelphia, Pa.

[22] Filed: Oct. 26, 1971

[21] Appl. No.: 192,588

[52] U.S. Cl............................... 424/279; 260/343.6
[51] Int. Cl.$^2$....................................... A61K 31/335
[58] Field of Search..................................... 424/279

[56] References Cited
OTHER PUBLICATIONS

Beilstein, Vol. 18, pp. 481–482 (1885).
Chem. Abst., 20, 28497 (1926).

Primary Examiner—Stanley J. Friedman
Attorney, Agent, or Firm—Joseph A. Marlino; Richard D. Foggio; William H. Edgerton

[57] ABSTRACT

Pharmaceutical compositions having anti-arthritic activity comprising an amide derivative of pulvinic acid and methods of producing anti-arthritic activity by administering internally said compositions.

9 Claims, No Drawings

ANTI-ARTHRITIC COMPOSITIONS COMPRISING AMIDE DERIVATIVES OF PULVINIC ACID AND METHODS OF PRODUCING ANTI-ARTHRITIC ACTIVITY

This invention relates to pharmaceutical compositions having anti-arthritic activity and to a method of producing anti-arthritic activity by administering said compositions. More specifically, the compositions of this invention comprise a pulvinic acid amide derivative as the active medicament.

Most advantageously the compositions of this invention are in dosage unit form and comprise a nontoxic pharmaceutical carrier and a pulvinic acid amide derivative which has the following structural formula:

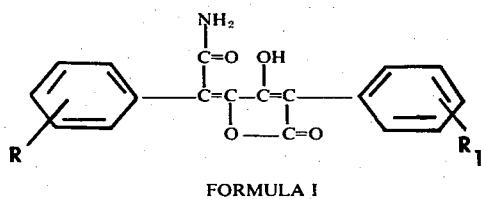

FORMULA I wherein: R and $R_1$ each represent hydrogen, lower alkyl having from one to four carbon atoms, chlorine, bromine or fluorine.

Preferably the compositions of this invention comprise a compound of Formula I when R and $R_1$ are hydrogen, methyl or chlorine.

The pulvinic acid amide derivatives, as illustrated in Formula I and present in these novel compositions, are prepared by the synthetic method outlined as follows:

in which R and $R_1$ are as defined above for Formula I. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a phenylacetonitrile in an alcoholic solution of an alkali metal lower alkoxide, such as sodium methoxide or ethoxide to yield the 2,5-diphenyl-3,4-dioxoadiponitrile. The above condensations may also be carried out using a metal hydride, such as sodium hydride, in diglyme. The adiponitrile derivative is refluxed for a short period of time, for example one or two hours, in an aqueous acid solution such as water/glacial acetic acid/concentrated sulfuric acid mixture and the resulting pulvinic acid is refluxed with acetic anhydride to furnish the corresponding pulvinic acid lactone of Formula II above. The dilactone is ring opened to the amides of Formula I by brief heating with ammonium hydroxide.

Alternatively, the amide derivatives of this invention can be prepared by partial hydrolysis of the 2,5-diphenyl-3,4-dioxoadiponitrile with a mineral acid such as hydrochloric acid in the presence of acetic acid. The reaction is carried out at reflux temperature for a period of up to one hour.

When R and $R_1$ are different in the above synthetic sequence, the ring opening of the dilactone of Formula II gives a mixture of positional isomers, namely compounds of Formula I and compounds of the following formula:

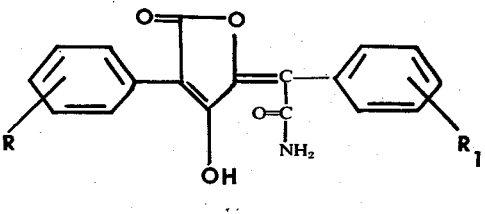

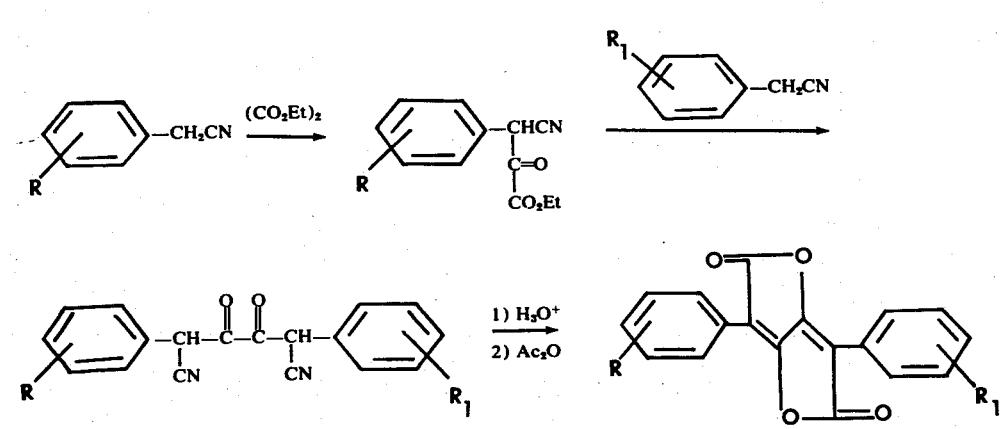

FORMULA II

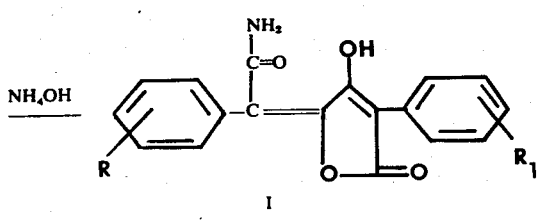

I

FORMULA III

The ratio of isomers obtained is variable and depends on the nature of R and $R_1$. The isomers can be separated by fractional crystallization and/or chromatographic procedures. Their identity is determined from the nuclear magnetic resonance patterns of the aromatic protons. This identification can be confirmed by degradative ozonolysis.

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses of from 8 mg. to 32 mg. per kilogram of body weight. Adjuvant arthritis in rats is produced by a single injection of 0.75 mg. of *Mycobacterium butyricum* suspended in white paraffin (N.F.) into a hind paw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The pharmacological profile of the compositions of this invention is further enhanced by the analgesic and antipyretic activity produced by the compounds of Formula I at anti-arthritic doses as demonstrated in standard pharmacological test procedures.

The pharmaceutical compositions of this invention are prepared in conventional dosage unit forms by incorporating an amount of a compound of Formula I sufficient to produce anti-arthritic activity with a non-toxic pharmaceutical carrier according to accepted procedures. Preferably the compositions will contain the pulvinamide derivative of Formula I in an amount of from about 10 mg. to about 50 mg. per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents.

The method in accordance with this invention comprises administering internally to an animal an amide derivative of pulvinic acid of Formula I above, usually combined with a pharmaceutical carrier, in an amount sufficient to produce anti-arthritic activity. The active medicament will be administered in a dosage unit, preferably in an amount of from about 10 mg. to about 50 mg. The route of administration may be orally or parenterally, the oral route being preferred. Advantageously equal doses will be administered one to three times daily with the daily dosage regimen being from about 10 mg. to about 150 mg. When the method described above is carried out, anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto.

EXAMPLE 1

A mixture of 117.1 g. of phenylacetonitrile and 326 ml. of ethyl oxalate is added to an ethanol solution of sodium ethoxide (prepared by dissolving 23.8 g. of sodium in 500 ml. of absolute ethanol) and refluxed 2 hours. After cooling, diluting with 2500 ml. of water and extracting with ether, the solution is acidified with acetic acid. The solid is removed and washed with water to give ethyl 3-cyano-3-phenylpyruvate, m.p. 127°–129° C.

Ethyl 3-cyano-3-phenylpyruvate 50.0 g. and 41.0 g. of phenylacetonitrile are added to an alcoholic solution of sodium ethylate [prepared from 13.4 g. (0.58 g. atom) of sodium and 360 ml. of absolute ethanol] and the resulting yellow solution is refluxed for 1¾ hours. The cooled solution is diluted with 700 ml. of water and acidified by slow addition of acetic acid. After further cooling in ice, the suuspension is filtered and the removed solid washed with water and dried to give 2,5-diphenyl-3,4-dioxoadiponitrile, m.p. 284°–286° C. (d.).

A mixture of 30.0 g. of 2,5-diphenyl-3,4-dioxoadiponitrile in 260 ml. of water, 380 ml. of glacial acetic acid and 190 ml. of concentrated sulfuric acid is refluxed for 1 hour. The suspension is cooled, poured onto 900 ml. of ice-water and the solid removed and washed to give pulvinic acid, m.p. 215°–216.5°C.

Pulvinic acid 19.0 g. is refluxed in 250 ml. of acetic anhydride for 15 minutes. The cooled solution is stirred into 1200 ml. of ice and water and the oily mass crystallized by stirring in 500 ml. of ethanol. The yellow solid is removed, washed with ethanol and dried to yield pulvinic acid lactone, m.p. 221.5°–223° C.

A mixture of 10.0 g. of pulvinic acid lactone in 80 ml. of acetone and 200 ml. of ammonium hydroxide is heated for 5 minutes. The reaction mixture is cooled, diluted to 600 ml. with water and slowly acidified with concentrated hydrochloric acid. The solid is filtered, washed with water and dried to yield pulvinic acid amide having an m.p. of 221°–223° C.

EXAMPLE 2

A mixture of 45.3 g. of p-chlorophenylacetonitrile and 107 g. of diethyl oxalate in an alcohol sodium ethylate solution (prepared by dissolving 7.13 g. of sodium in 120 ml. of absolute ethanol) is refluxed with stirring for two hours. The cooled reaction mixture is diluted with 700 ml. of water, acidified with acetic acid and cooled to ice bath temperature. The resulting solid is recrystallized from aqueous methanol to give ethyl 3-cyano-3-(p-chlorophenyl)-pyruvate, m.p. 134°–135°C.

Ethyl 3-(p-chlorophenyl)-3-cyanopyruvate, 40 g., and p-chlorophenylacetonitrile, 49.8 g. are added to an alcoholic solution of sodium ethylate [prepared from 7.36 g., (0.32 g. atom) of sodium and 190 ml. of absolute ethanol] and the resulting solution is refluxed for 2 hours. The reaction mixture is diluted with water, acidified with acetic acid and cooled to ice bath temperature to yield 2,5-di-(p-chlorophenyl)-3,4-dioxoadiponitrile, m.p. 280° C.

A solution of 15 g. of 2,5-di-(p-chlorophenyl)-3,4-dixoadiponitrile in a mixture of 150 ml. of water, 210 ml. of acetic acid and 105 ml. of concentrated sulfuric acid is stirred and refluxed for two hours. The reaction mixture is diluted with 500 ml. of water and cooled to ice bath temperature to yield 4,4'-dichloropulvinic acid, m.p. 255° C. The acid is refluxed in acetic anhydride to obtain the corresponding 4,4'-dichloropulvinic acid lactone, m.p. 236° C.

A mixture of 5.6 g. of 4,4'-dichloropulvinic acid lactone in 45 ml. of acetone and 115 ml. of ammonium hydroxide is heated for 5 minutes. The reaction mixture is cooled, diluted to 325 ml. with water and slowly acidified with concentrated hydrochloric acid. The solid is filtered, washed with water and dried to give 4,4'-dichloropulvinamide, m.p. 237°–238° C.

Similarly, by employing m-chlorophenylacetonitrile in the initial reaction described above to obtain ethyl 3-cyano-3-(m-chlorophenyl)-pyruvate, followed by reaction with m-chlorophenylacetonitrile and the subsequent synthetic steps, there is prepared the isomeric product 3,3-'dichloropulvinamide.

EXAMPLE 3

Following the procedures outlined in Examples 1 and 2, p-methylphenylacetonitrile and diethyl oxalate are reacted in alcoholic sodium ethoxide to obtain ethyl 3-cyano-3-(p-methylphenyl)-pyruvate. The latter is reacted with p-methyl-phenylacetonitrile to give 2,5-di-(p-methylphenyl)-3,4-dioxoadiponitrile, m.p. 257° C.

The adiponitrile is refluxed with water, acetic acid and concentrated sulfuric acid to give 4,4'-dimethylpulvinic acid, which is refluxed in turn with acetic anhydride to yield 4,4'-dimethylpulvinic acid lactone, m.p. 275°–276° C. The lactone is ring opened with ammonium hydroxide and hydrochloric acid to the product 4,4'-dimethylpulvinamide, m.p. 245°–248° C.

EXAMPLE 4

Following the procedures outlined in Examples 1 and 2, p-chlorophenylacetonitrile is reacted with diethyl oxalate in alcoholic sodium ethoxide solution to give ethyl 3-cyano-3-(p-chlorophenyl)-pyruvate which is then similarly reacted with phenylacetonitrile to yield 2-(p-chlorophenyl)-5-phenyl-3,4-dioxoadiponitrile, m.p. 210° C. (d.).

A solution of the adiponitrile in water, acetic acid and concentrated sulfuric acid is refluxed for 2 hours and the resulting crude mixture of 4- and 4'-chlorpulvinic acid is refluxed in acetic anhydride to give 4-chloropulvinic acid lactone, m.p. 213°–214° C.

A mixture of 5.5 g. of 4-chloropulvinic acid lactone in 40 ml. of acetone and 100 ml. of ammonium hydroxide is warmed for 5 minutes, cooled and acidified with concentrated hydrochloric acid. The yellow solid is filtered, washed with water and dried to yield 4-chloropulvinamide.

Similarly, by employing m-methylphenylacetonitrile in the initial reaction described above to obtain ethyl-3-cyano-3-(m-methylphenyl)-pyruvate followed by reaction with phenylacetonitrile and the subsequent synthetic steps to yield 3-methylpulvinamide.

EXAMPLE 5

| Ingredients | Mg./Tablet |
| --- | --- |
| Pulvinamide | 10 |
| Calcium sulfate, dihydrate | 150 |
| Sucrose | 25 |
| Starch | 15 |
| Talc | 5 |
| Stearic acid | 3 |

The sucrose, calcium sulfate and pulvinamide are thoroughly mixed and granulated with hot 10% gelatin solution. The wetted mass is passed through a No. 6 mesh screen directly onto drying trays. The granules are dried at 120° C. and passed through a No. 20 mesh screen, mixed with the starch, talc and stearic acid, and compressed into tablets.

EXAMPLE 6

| Ingredients | Mg./Capsule |
| --- | --- |
| 4,4'-Dichloropulvinamide | 50 |
| Magnesium Stearate | 5 |
| Lactose | 350 |

The above ingredients are screened through a No. 40 mesh screen, mixed and filled into No. 0 hard gelatin capsules.

What is claimed is:

1. A pharmaceutical composition having anti-arthritic activity, in dosage unit form, comprising a pharmaceutical carrier and from about 10 mg. to about 50 mg. of an amide derivative of pulvinic acid of the formula:

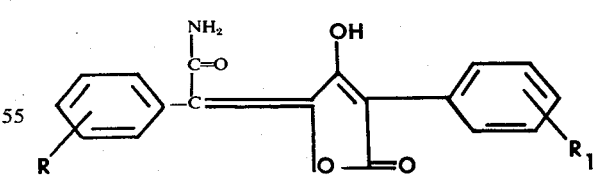

in which:
R and $R_1$ are each hydrogen, chlorine, bromine, fluorine or lower alkyl.

2. A pharmaceutical composition according to claim 1 in which R is hydrogen.

3. A pharmaceutical composition according to claim 2 in which $R_1$ is hydrogen.

4. A pharmaceutical composition according to claim 2 in which $R_1$ is chlorine.

5. A pharmaceutical composition according to claim 2 in which $R_1$ is methyl.

6. The method of producing anti-arthritic activity which comprises administering internally to an animal organism in an amount sufficient to produce said activity an amide derivative of pulvinic acid of the formula:

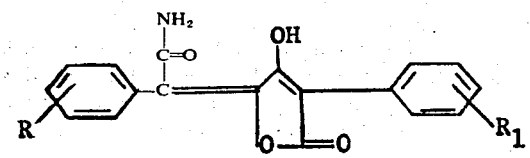

in which:
R and $R_1$ are each hydrogen, chlorine, bromine, fluorine or lower alkyl.

7. The method according to claim 6 in which R is hydrogen.

8. The method according to claim 7 in which $R_1$ is hydrogen.

9. The method according to claim 8 in which the active medicament is administered in a daily dosage regimen of from about 10 mg. to about 150 mg.

* * * * *